US012700103B1

(12) United States Patent
Moodie et al.

(10) Patent No.: US 12,700,103 B1
(45) Date of Patent: Aug. 4, 2026

(54) SYSTEM AND METHOD FOR IMAGE DATA ANALYSIS FOR OBJECTIVE ANALYSIS OF JOINT MOTION DATA

(71) Applicant: DARI Motion, Inc., Grand Island, NE (US)

(72) Inventors: Patrick Moodie, Shawnee, KS (US); Derek Wassom, Olathe, KS (US)

(73) Assignee: DARI Motion, Inc., Grand Island, NE (US)

( * ) Notice: Subject to any disclaimer, the term of this patent is extended or adjusted under 35 U.S.C. 154(b) by 600 days.

(21) Appl. No.: 17/985,119

(22) Filed: Nov. 10, 2022

Related U.S. Application Data

(60) Provisional application No. 63/278,856, filed on Nov. 12, 2021.

(51) Int. Cl.
        *G06K 9/00*          (2022.01)
        *G06T 7/20*          (2017.01)
(52) U.S. Cl.
        CPC ............ *G06T 7/20* (2013.01); *G06T 2200/24* (2013.01); *G06T 2207/30196* (2013.01)

(58) Field of Classification Search
        None
        See application file for complete search history.

(56)                References Cited

U.S. PATENT DOCUMENTS

2020/0250408 A1*   8/2020   Takeichi .............. A61B 5/1128
2021/0315486 A1*  10/2021   Delp ..................... G16H 50/50

* cited by examiner

*Primary Examiner* — Wei Wen Yang
(74) *Attorney, Agent, or Firm* — Husch Blackwell LLP

(57)                ABSTRACT

The disclosure related to methods and systems for image data analysis for objectively analyzing joint motion data. In one embodiment, the methods and system disclosed herein use automated methods to capture image data, extract motion data, and determine an objective score for one or more joints in one or more motions. The system and methods disclosed herein comprise a motion capture system with one or more image capture devices to obtain motion data for a subject and using one or more regression models and analysis techniques, various objective scores can be generated related to the subject's joint motion.

20 Claims, 5 Drawing Sheets

200

- Capture image data from subject using image or motion capture device(s) — 210
- Extract kinematic data from image data — 212
- Define the population against which to compare the subject's motion — 214
- Select regression model of a joint motion of the population — 216
- Compare subject's motion with motion of population and regression model thereof — 218
- Quantify differences between subject motion and motion of population — 220
- Generate score for each of subject's joints — 222
- Generate an overall score for subject based on the scores for a defined set of subject's joints — 224
- Output score to display — 226

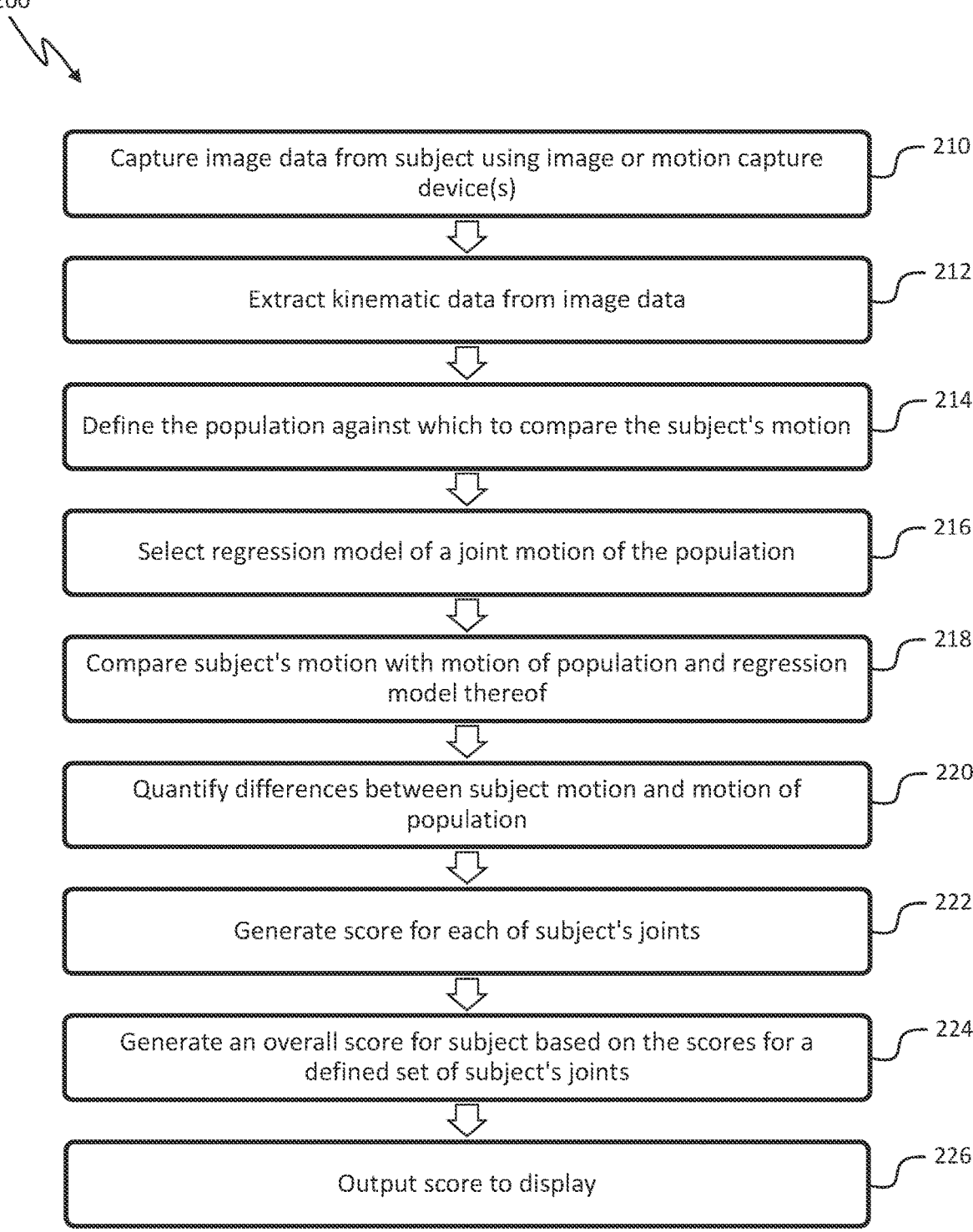

200

Capture image data from subject using image or motion capture device(s) — 210

Extract kinematic data from image data — 212

Define the population against which to compare the subject's motion — 214

Select regression model of a joint motion of the population — 216

Compare subject's motion with motion of population and regression model thereof — 218

Quantify differences between subject motion and motion of population — 220

Generate score for each of subject's joints — 222

Generate an overall score for subject based on the scores for a defined set of subject's joints — 224

Output score to display — 226

FIG. 2

| Joint List | Ratio |
|---|---|
| Left Shoulder | 0.81 |
| Right Shoulder | 0.84 |
| Left Hip | 0.75 |
| Right Hip | 0.80 |
| Left Knee | 0.72 |
| Right Knee | 0.73 |
| Left Ankle | 0.80 |
| Right Ankle | 0.82 |
| Spine | 0.84 |
| Overall Person Ratio | 0.79 |

SYSTEM AND METHOD FOR IMAGE DATA ANALYSIS FOR OBJECTIVE ANALYSIS OF JOINT MOTION DATA

CROSS-REFERENCE TO RELATED APPLICATIONS

This application claims priority to U.S. Provisional Patent Application Ser. No. 63/278,856, filed on Nov. 12, 2021, to Patrick Moodie et. al., entitled "System and Method for Objectively Analyzing and Using Population Norms for Joint Motion Capture and Care Pathways," the entire enclosure of which is incorporated herein by reference.

BACKGROUND OF THE INVENTION

The field of the present invention relates generally to systems and methods for image processing and analysis to objectively evaluate joint and limb motion.

In the fields of occupational therapy, physical therapy, orthopedic rehabilitation, athletic training, sports science and medicine, and exercise physiology, there has historically existed a lack of consistency and uniformity in the analysis of joint and limb motion. This is due partly to the subjectiveness associated with evaluating such joint and limb motion. Typically, a therapist or caregiver will measure a specified joint angle for a particular movement using a goniometer and then record the measured angle. Based on the measured angle, a designation such as "Low," "Moderate," "Satisfactory," "Optimal," or "Severe" is often assigned, wherein each designation may be associated with an arbitrary numerical value (0, 1, 2, 3, etc.). While the designations and accompanying numerical values may be generally associated with a perceived or measured angle, there is a large amount of subjectivity built into currently known joint motion evaluation methods.

Accordingly, a need exists for a system and method for objectively analyzing and scoring limb and joint motion. A further need exists for a system and method for comparing a subject's joint range of motion against that of a population linear regression for purposes of objective analysis.

BRIEF SUMMARY OF THE INVENTION

The present invention is directed generally to systems and methods for analyzing image data and extracted motion data to objectively evaluate joint motion related to a subject. The system can be provided in the form of a motion capture analysis system determined to generate a score for each of the subject's joints and provide an overall score based on scores for a defined set of the subject's joints.

According to a first embodiment, a motion analysis system for image data analysis and objective evaluation of joint motion can include a motion capture system and one or more image data capture devices designed to capture image data. In some embodiments, the motion capture system may be provided in the form of a markerless motion capture system. The system can further include motion data extracted from the image data. In some embodiments, the motion data may include kinematic data, kinetic data, or a combination thereof. The system can also include a regression model selection module designed to select a regression module for analyzing the motion data. The system can further include a scoring module designed to calculate a score based on an output of the regression module compared to the motion data of a subject. In some embodiments, the system can further comprise a user interface, wherein an output score is generated from the scoring module and can be generated on the user interface. In some embodiments, the output of the scoring module can include a visual representation of an output score for the subject. In some embodiments, the regression module can include at least one of a linear, multi-linear, logistic, polynomial, quantile, principle components, partial least squares, support vector, Poisson, quasi, Cox, Tobit Lasso, Beta, Burr, log-normal, Gamma, Logarithmic, or Ridge regression module. In some embodiments, the system further comprises a population database with measurements from a plurality of subjects. In this embodiment, the regression model can be used to create a regression formula derived from a slope of the population database.

According to a second embodiment, a motion analysis method for analyzing image data and scoring joint motion comprises capturing image data and extracting motion data of a subject performing a specific movement from the image data. In some embodiments, the motion data can include kinematic data, kinetic data, or a combination thereof. The method can further include defining a population against which to compare the subject and selecting a regression formula for the specific movement of the population. The method can also include generating a score for the subject based on a comparison of the subject's motion data relative to the regression formula output. In one embodiment, the method can further comprise the step of generating a first variable ratio for a first measurement of a first joint of the subject for the specific movement. In this embodiment, the first variable ratio is generated using at least one of a linear, multi-liner, logistic, polynomial, quantile, principle components, partial least squares, support vector, Poisson, quasi, Cox, Tobit Lasso, Beta, Burr, log-normal, Gamma, Logarithmic, or Ridge regression model. In one embodiment, the first variable ratio is generated in accordance with the following:

$$\underset{\substack{Dependent\\Variable}}{\searrow} Y_i = \underbrace{\underset{\substack{Population\\Y\ intercept}}{\overset{}{\beta_0}} + \underset{\substack{Population\\Slope\\Coefficient}}{\overset{}{\beta_1}} \underset{\substack{independent\\variable}}{\overset{\downarrow}{X_i}}}_{Linear\ component} + \underbrace{\underset{\substack{Random\\Error\\term}}{\overset{}{\varepsilon_i}}}_{\substack{Random\ Error\\component}}.$$

In one embodiment, the first variable ratio is generated in accordance with the following:

$$\begin{bmatrix} c_1 \\ c_2 \\ c_3 \end{bmatrix} =$$

$$\begin{bmatrix} \sum_{k=1}^{n} f_1^2(x_k) & \sum_{k=1}^{n} f_1(x_k)f_2(x_k) & \sum_{k=1}^{n} f_1(x_k)f_3(x_k) \\ \sum_{k=1}^{n} f_2(x_k)f_1(x_k) & \sum_{k=1}^{n} f_2^2(x_k) & \sum_{k=1}^{n} f_2(x_k)f_3(x_k) \\ \sum_{k=1}^{n} f_3(x_k)f_1(x_k) & \sum_{k=1}^{n} f_3(x_k)f_2(x_k) & \sum_{k=1}^{n} f_3^2(x_k) \end{bmatrix}^{-1} \cdot \begin{bmatrix} \sum_{k=1}^{n} f_1(x_k) \cdot y_k \\ \sum_{k=1}^{n} f_2(x_k) \cdot y_k \\ \sum_{k=1}^{n} f_3(x_k) \cdot y_k \end{bmatrix}.$$

In one embodiment, the method further comprises the step of generating a second variable ratio for a second measurement of the first joint of the subject for the specific movement. In another embodiment, the method further comprises the step of combining the first variable ratio with at least the second variable ratio to generate a first composite score for the first joint of the subject for the specific movement. In one embodiment, the method further comprises the step of combining the first variable ratio with at least the second variable ratio to generate a first composite score for the first joint of the subject for the specific movement. In one embodiment, the method further comprises the step of combining the first composite score with at least a second composite score to generate an overall score for the first joint of the subject. In another embodiment, the method further comprises combining the overall score for the first joint of the subject with an overall score for at least a second joint of the subject to generate an overall subject score.

In a third embodiment, a motion analysis system for image data analysis and objective evaluation of joint motion can include a markerless motion capture system and one or more image data capture devices designed to capture image data. The system can further include motion data extracted from the image data. The system can also include a regression model selection module designed to select a regression module for analyzing the motion data, wherein a regression model output is generated from the regression model selection module. The system can further include a scoring module designed to calculate a score associated with a subject, wherein the score can be calculated based on a comparison of the subject's motion data relative to the regression model output. In some embodiments, the score can include a joint score, an overall score provided in the form of an average of a plurality of joint scores, or a combination thereof.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWING

In the accompanying drawings, which form a part of the specification and are to be read in conjunction therewith in which like reference numerals are used to indicate like or similar parts in the various views:

FIG. 2 is a flow diagram of a method illustrating steps carried out in accordance with an embodiment of the present invention;

DETAILED DESCRIPTION OF THE INVENTION

Figure 1:
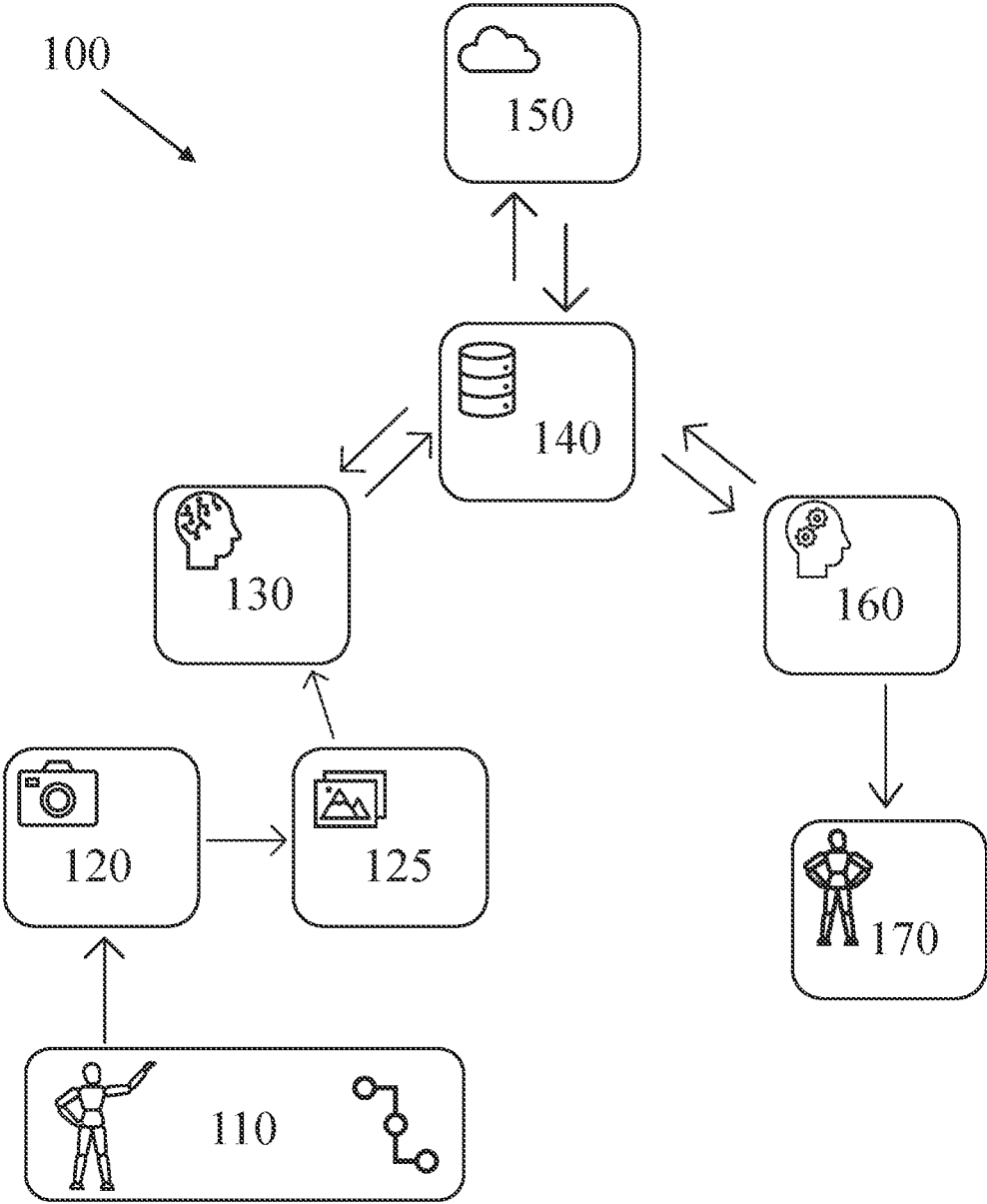
FIG. 1 is a system diagram of a system in accordance with an embodiment of the present invention.

Various embodiments of the present invention are described and shown in the accompanying materials, descriptions, instructions, and drawings. For purposes of clarity in illustrating the characteristics of the present invention, proportional relationships of the elements in the images have not necessarily been maintained. It will be appreciated that the images are simply provided as examples as part of case study summaries.

The following detailed description of the invention references specific embodiments in which the invention can be practiced. The embodiments are intended to describe aspects of the invention in sufficient detail to enable those skilled in the art to practice the invention. Other embodiments can be utilized, and changes can be made without departing from the scope of the present invention. The present invention is defined by the appended claims and the description is, therefore, not to be taken in a limiting sense and shall not limit the scope of equivalents to which such claims are entitled.

One aspect of the present invention is directed generally to a system and method of image processing and analysis for objectively analyzing, assessing, evaluating, and/or scoring limb and joint motion. A variable-based ratio scoring platform is also provided herein. The present invention provides a practical and versatile means for analyzing image data to score limb and joint movement.

Depending upon the joint(s) and motion(s) being evaluated, movement in six degrees of freedom (pitch, roll, and yaw) about three axes (x, y, and z) may be evaluated.

The system and method of the present invention may be utilized to compare and score a subject against an entire population, against a defined subset of the entire population, and/or against the subject's previous sessions. It will be understood that, where used herein, "subject" may include, but is not limited to a person, a patient, a user, or similar. More specifically, under the present invention, the range of motion (ROM) of one or more of a subject's joints may be evaluated and scored. As used herein, ROM refers generally to the angular rotation and distance at which a joint can move. In certain circumstances, a joint's ROM may be limited by several factors including injury, structural or mechanical issues in the joint, swelling of tissue around the joint, muscular deficiencies, pain, or other factors prohibiting movement within the joint.

It will be appreciated that the present invention may be utilized in objectively assessing healthy subjects, as well as subjects who have sustained an injury, are undergoing prehabilitation or rehabilitation, are recovering from a surgical procedure, have a change in physical condition, or other circumstances where assessment may be appropriate. As such, the present invention can be implemented to objectively track and compare a subject's joint and limb motion during prehabilitation and rehabilitation treatments, and in a manner that may be consistent with objective assessments and outcomes required for bundled-payment initiatives for Medicare programs and reimbursement payments from Centers for Medicare and Medicaid Services (CMS).

FIG. 1 illustrates a system diagram of an embodiment of a motion analysis system 100 used for capturing image data and processing motion data extracted from the image data to objectively evaluate joint scores in connection with the present invention. The motion analysis system 100 includes a 3D motion capture system 110 for capturing motion data for a subject, one or more image data capture devices 120, captured image data 125, a regression model module 130, one or more databases 140 comprising population data, a network 150, a scoring module 160, and a display 170.

A variety of motion capture systems 110 and methods may be utilized, including but not limited to the systems and methods marketed by DARI Motion Inc. (doing business as DARI Motion). Various embodiments of DARI Motion's motion capture system and method are described in U.S. Pat. No. 8,527,217 entitled "Apparatus and Method for Physical Evaluation" (the "'217 patent"), the entire disclosure of which is incorporated herein by reference.

In various embodiments, the one or more image data capture devices 120 can refer to a camera, image capture device, scanning device, or other sensing devices. In one embodiment, the one or more image data capture devices 120 may include an image sensor system and/or an image data capture system. In one embodiment, the one or more image data capture devices 120 may include a camera configured to obtain image data within a field of view. In one non-limiting example, the one or more image data capture devices 120 may be configured to capture and/or retrieve the image data 125, provided in the form of image files of motion data from a subject located within the motion captures system 110. The term "motion data" as used herein can include but is not limited to kinematic data, kinetic data, and similar. Also, it will be recognized by one skilled in the art that where kinematic data and/or kinetic data are used throughout the present disclosure, the application that other types of motion data are contemplated within the scope of the embodiments described herein.

In some embodiments, the image data 125 can be transformed, or similar, through a digital image creation process. In some embodiments, the digital image creation process may include image transfer from a camera or other image data capture device 120 to a workstation. In some embodiments, other digital image processing techniques can be implemented at the workstation. In some embodiments, the digital image processing techniques can include feedback or other communication with the image data 125. In some embodiments, the digital image processing techniques can include generating a 3D skeletal or skeleton construction. In some embodiments, the 3D skeletal construction data can include raw video data and/or biovision hierarchical data (BVH). The 3D skeletal construction can be saved as the image data 125 or otherwise processed as a component or aspect of the image data 125, in some embodiments. In some embodiments, the 3D skeletal construction data can be saved to the one or more databases 140, as described in more detail below.

The image data 125 can be analyzed using one or more regression model modules 130. In certain embodiments, motion data, or other types of type can be extracted from the image data 125 and analyzed using one or more regression model modules 130 to select a regression model. It will be understood that when used herein, "regression model" can also include a distribution model and the "regression model modules" can also include distribution model modules. In certain embodiments, the image data 125 is analyzed using one or more regression or distribution to select the appropriate regression model based on one or more parameters. As will be described in connection with FIG. 2, the regression model selection step may be executed by the scoring module

160. The regression models are discussed in more detail in connection with FIGS. 3A-3C.

The image data 125 and extracted kinetic data (not shown) can be stored in the one or more databases 140. The data stored in the databases 140 can also include a plurality of data elements, including population data comprising images, image files, image data, videos, video files, video data, calibration data, parameter data, validation data, threshold data, etc. The information received or collected by the motion capture system 110 can be stored in the one or more databases 140. In at least one embodiment, the one or more databases 140 may include a local database and a normative database. In some embodiments, the normative database can include data related to the one or more regression or distribution models, including a normative data model, which can include the one or more regression or distribution models evaluated as part of the objective scoring process described herein. In some embodiments, the local database can include session data, wherein the session data is related to a motion capture session for a particular user. In some embodiments, the session data can include motion data, image data, video data, and other data captured by the motion capture system 110 during a session. In this example, the session can be determined by a session start or a session initialization and a session end or a session termination. In some embodiments, the session start/initialization can be triggered by user input on a user interface, by adding a parameter or tag to the session data, or automatically when a user is detected in the field of view of the motion capture system 110. In some embodiments, the session start/initialization can include a request to the image data capture devices 120 to capture image data 125 in response to the request. In some embodiments, the session end/termination can be triggered by user input on a user interface, by adding a parameter or tag to the session data, or automatically when the user is detected to leave the field of view of the motion capture system. In some embodiments, the one or more databases 140 can be provided in the form of a memory unit, processor, elastic cache system, cloud storage, or similar.

In some embodiments, the devices and aspects of FIG. 1 can communicate directly with one another over the network 150. The network 150 includes, for example, the Internet, intranets, extranets, wide area networks ("WANs"), local area networks ("LANs"), wired networks, a coaxial cable data communication network, an optical fiber network, a direct wired serial communication connection (e.g., USB), wireless networks, such as a WiFi network, a radio communication network, a cellular data communication network (e.g., 4G, 5G, LTE, etc.), a direct wireless communication connection (e.g., Bluetooth, NFC, etc.), or other suitable networks, or any combination of two or more such networks. For example, such networks can include satellite networks, cable networks, Ethernet networks, and other types of networks. In some embodiments, the network may be a private network (e.g., a private LAN), a public network (e.g., the internet), or a combination of private and/or public networks.

In some embodiments, the motion analysis system 100 can execute a scoring module 160 to generate one or more objective joint scores. In some embodiments, the scoring system 160 can include a user interface, a communication interface to transmit information to a user interface, or a combination thereof. In some embodiments, the normative data model and/or normative database of the regression model module 130 and/or included in the one or more databases 140, may communicate over the network 150 to accomplish one or more cloud data processing tasks, including storing, transmitting, transforming, and processing the data in a cloud data storage platform (not shown). In some embodiments, the cloud data storage may include the motion data, the image data, the session data, report data generated from the output of the system, and/or population data of one or more of the data types described herein.

In certain embodiments, the regression model module 130 and/or the scoring module 160 can include machine learning, artificial intelligence, a linear statistical model, a non-linear model, a regression or distribution module (not limited to those regression modules described herein), a neural network, other processing models, other modeling and analysis techniques, or a combination thereof.

In certain embodiments, the regression model module 130 and/or the scoring module 160 can be created using training data including image data and motion data from the population data, in one non-limiting example, each sample training set has pre-determined values for one or more parameters. In some embodiments, the regression model module 130 can include the normative data model and can use training data stored in the normative database.

In one embodiment, a user interface of the scoring system 160 can be a computing device and can be in communication with one or more input or output devices (see FIG. 5B) that are capable of receiving and/or generating a display of the calculated score, a report, and other analysis parameters, as described in more detail in connection with FIGS. 4A-5B.

In some embodiments, the computing device input or output devices can be configured to receive inputs into and/or any outputs from the computing device or other aspects of the scoring system 160 or the motion analysis system 100 overall. Embodiments of input devices can include but are not limited to, a keyboard, a mouse, a touchscreen display, a touch-sensitive pad, a motion input device, a movement input device, an audio input, a pointing device input, a joystick input, a keypad input, peripheral device, foot switch, or similar input device. Embodiments of output devices can include but are not limited to, an audio output device, a video output, a display device, a motion output device, a movement output device, a printing device, or a similar output device. In some embodiments, the user interface includes hardware that can be designed to communicate with one or more input devices and/or output devices via wired and/or wireless connections.

In some embodiments, the communications interface of the scoring system 160 can be designed to communicate with various computing devices and/or networks, including communication over network 150. In some embodiments, the communications interface is capable of communicating data, content, and/or any other information, that can be transmitted, received, operated on, processed, displayed, stored, and similar. Communication via the communications interface may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, communication via the communications interface may be executed using a wireless data transmission protocol, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High-Speed Packet Access (HSPA), High-Speed Downlink Packet Access (HSDPA), IEEE 802.1 1 (WiFi), WiFi Direct, 802.16 (WiMAX), ultra-wideband (UWB), infrared (IR) protocols, near field communication (NFC) protocols, Wibree, Bluetooth protocols, wireless universal serial bus (USB) protocols, or any other wireless protocol.

In some embodiments, the motion analysis system 100 can also include or communicate with a computing device or computing environment (not shown). In some embodiments, the computing environment can be provided in the form of one or more computing devices, server banks, computer banks, a desktop computer, a laptop computer, a cellular telephone, a tablet, a phablet, a notebook computer, a distributed system, a gaming console (e.g., Xbox, Play Station, Wii), a watch, a pair of glasses, a key fob, a radio frequency identification (RFID) tag, an earpiece, a scanner, a television, a dongle, a camera, a wristband, a wearable item, a kiosk, an input terminal, a server, a server network, a blade, a gateway, a switch, a processing device, a processing entity, a set-top box, a relay, a router, a network access point, a base station, any other device configured to perform the functions, operations, and/or processes described herein, or any combination thereof. Such computing devices can be located in a single installation or may be distributed among many different geographical locations. In another embodiment, a controller, processor, or similar, may be used to implement aspects of FIG. 1 or otherwise execute program instructions related to the processes described herein.

Computing and other devices discussed herein can include a memory unit. A memory unit can comprise volatile or non-volatile memory to not only provide space to execute program instructions, algorithms, or the advanced analytics models described herein, but to provide the space to store the instructions, data, and other information. In embodiments, volatile memory can include random access memory (RAM), dynamic random-access memory (DRAM), or static random-access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the invention.

FIG. 2 illustrates an embodiment of a method 200 that can be employed in connection with the present invention. First, a motion capture step 210 is undertaken where image data, including motion data, is obtained using a suitable motion capture system and method. The kinematic data may be captured from one or more of a variety of movements of the subject, including but not limited to, a bilateral squat, a left leg squat, a right leg squat, a vertical jump, a depth jump, a concentric jump, an eccentric jump, a box jump, a left leg jump, a right leg jump, a left lunge, a right lunge, a sprint, a run, a walk, a stair step, a pelvic rotation, a hip extension, a hip flexion, a hip abduction, a hip adduction, a hip backward extension, a knee flexion, an ankle rotation, an ankle flexion, an ankle extension, an arm raise, a shoulder abduction, a shoulder adduction, a shoulder flexion, a shoulder extension, an elbow rotation, a forearm pronation, a forearm supination, a torso forward bending movement, a torso rotation, a torso lateral flexion movement, a neck forward rotation, a neck backward rotation, a neck left lateral bend, a right lateral bend, or any other movement of a human or other vertebrate subject.

The motion data can be extracted from the image data in an extraction step 212. The motion data may include kinematic data and/or kinetic data. The kinematic data may include the angles and positions associated with the subject's body, segments, limbs, and/or joints during movement. Velocities, angular velocities, accelerations, and angular accelerations may also be captured and extracted if desired. Segment dimensions may also be obtained using the motion capture system 110 and extracted/evaluated kinematic data. As discussed in greater detail below, it will be appreciated that a markerless three-dimensional (3D) motion capture system 110, like the one shown in FIG. 5A may be used in capturing the image data in step 210. Markerless systems do not require subjects to wear special equipment for tracking. Special computer algorithms are designed to allow the system to analyze multiple streams of optical input and identify human forms, breaking them down into constituent parts for tracking. In one embodiment, the motion capture system 110 may include one of the systems currently, or in the future, offered by The Captury GmbH (doing business as The Captury). However, other devices and techniques for capturing motion data may alternatively be utilized and are within the scope of the present invention.

As will be further described herein, the motion capture step 210 may be achieved through the use of image data capture devices 120 and techniques, some of which do not require the use of a force plate. A variety of motion capture systems 110 and methods may be utilized, including but not limited to the systems and methods marketed by DARI Motion Inc., as described in more detail in connection with FIGS. 1, 5A, and 5B.

In step 214, a population may be defined against which the subject's motions and joint angles are compared. Depending upon the type of assessment being undertaken, the size and scope of the population may vary. For example, in one instance, comparisons may be against an entire population. In other instances, the subject may be compared against a subset consisting of only healthy members within the population. In further instances, the subject may be compared against a defined subset of the population, for example, based on one or more parameters such as age, gender, height, weight, occupation, past injury, surgical procedure, time from surgical procedure, etc.

In step 216, a regression or distribution model, such as a linear regression model in one non-limiting example, is used to create a formula derived from the slope of the population database 140 measurements. Alternatively, it will be appreciated that step 216 may occur before steps 210, 212, or step 214, in some embodiments. As described in more detail below, the regression for a particular joint movement can vary among the various joints depending upon the spread of data associated with the population. Generally speaking, joint movements with a greater degree of angular movement (e.g., knee flexion angle) have a higher variance as compared to joint movements with a lower degree of angular movement (e.g., knee valgus angle). It will be appreciated that depending upon the defined subset of the population selected, the resulting regression or distribution model formula may vary.

In step 218, the captured motion and angular data for one or more of the subject's joints are compared against the corresponding angular data from the regression or distribution model slope of the population. In step 220, the differences between the subject's joint motion and the population's average joint motion can be quantified and a score for one or more of the subject's joints can be generated at step 222. As discussed below, scores for each joint may be in a range from 0% to 100%, with the functionality included to remove data ranges from the top and bottom to account for any outliers. A score ranging from 0% to 100% can have altered thresholds to determine what an average population may look like.

Notwithstanding the foregoing, it will be appreciated that other scoring ranges may be utilized and are within the scope of the present invention including, for example, 0 to 10 (where a score of 5 would be average), 0 to 100 (where a score of 50 would be average), etc.

One method for generating a motion score for one of the subject's joints will now be described. In that method, the output variables may be normalized by using regression analysis, which is a predictive modeling technique illustrating the relationship between a dependent variable (e.g., target) and an independent variable (e.g., predictor). This technique can be used $$Y_i = f(X_i, \beta) + e_i$$

$Y_i$=dependent variable
f=function
$X_i$=independent variable
$\beta$=unknown parameters
$e_i$=error terms for finding effect relationships between variables. The resulting formula can account for the slope of a population-specific data set to better determine percentile rankings.

This puts any variable in a distribution on a sliding scale from 0% to 100%, accounting for the spread of the data using the population variable-specific regression curve. The upper and lower limits will be set at 5% to 95% to remove any outliers from the population data sets.

After calculating the normalized variable regression formula, as well as the minimum and maximum normalized variables, a score can be generated for the variable on a scale of 0% to 100%, wherein 100% represents the best score, and 0% represents the worst score. To account for different cases of variables, it must be determined whether a larger, smaller, or average value is deemed as 'optimal.' The variables are categorized into these three categories and can be scored on a scale of 0% to 100%, depending upon what is deemed the ideal value.

Figure 3A:
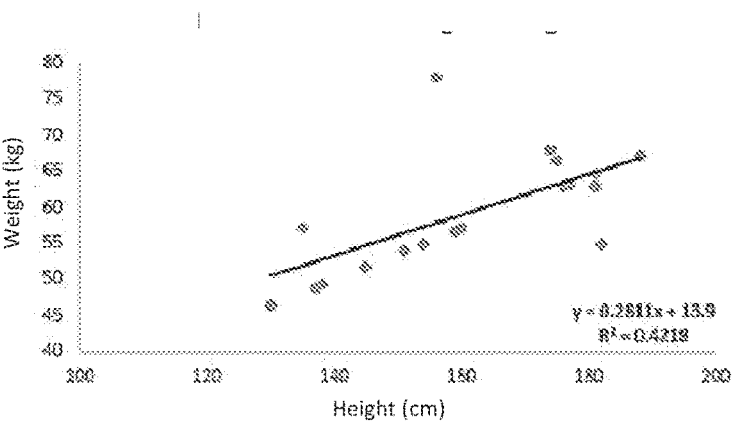
FIG. 3A is an illustrative graph for a linear regression model in accordance with an embodiment of the present invention.
Figure 3B:
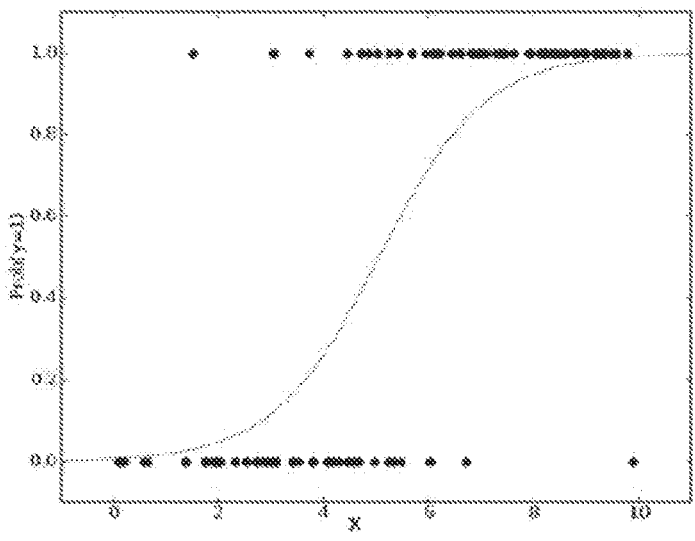
FIG. 3B is an illustrative graph for a logistic regression model in accordance with an embodiment of the present invention.
Figure 3C:
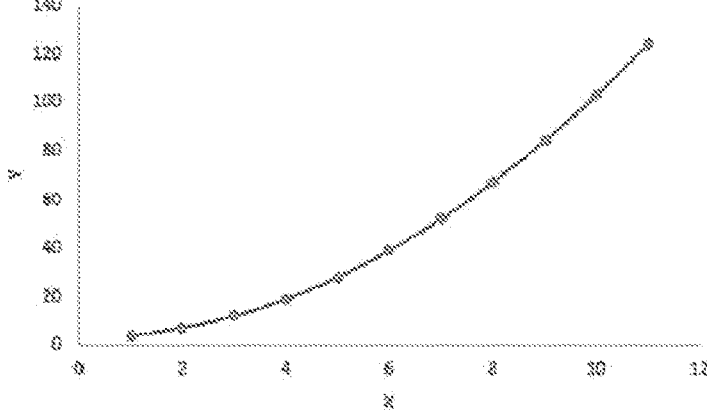
FIG. 3C is an illustrative graph for a polynomial regression model in accordance with an embodiment of the present invention.

In some cases, the regression or distribution model can be designed based on the population data and the judgment or classification of the output variable. In some embodiments, the regression or distribution model can be selected and/or designed using the one or more regression model modules 130. The regression models that may be used can include but are not limited to linear, multi-linear, logistic, polynomial, quantile, principle components, partial least squares, support vector, Poisson, quasi, Cox, Tobit Lasso, Beta, Burr, log-normal, Gamma, Logarithmic, and Ridge regression models, or other forms of regression. As illustrated in FIG. 3A, linear and multi-linear regression can be a best-fit line for the observed data by minimizing the sum of the squares of the vertical deviations. The positive or negative slopes can allow human movement variables to be judged on the agreement and normalized accordingly. FIG. 3B shows an example of logistic regression. Logistic regressions can be used when the result needs to be binary in logic. In human movement, this can be used to help determine if the variables cross a threshold of difference, also known as a classification, and can apply to linear and non-linear transformation and prediction ratios. As illustrated in FIG. 2C, polynomial regressions can be used when the power of the independent variable is more than 1. The result is that the best fit is not a straight line and is instead a curve that fits into the data curve. Ridge regression can be used when the data suffers from multicollinearity. The slope difference between the training data and the sampled data is different and a ridge regression accounts for the difference, reduces the error, and evolves the regression lines and formula.

$$= \operatorname*{argmin}_{\beta \in \mathbb{R}^P} \underbrace{\|y - X\beta\|_2^2}_{Loss} + \underbrace{\lambda \|\beta\|_2^2}_{Penalty}$$

Figures 4A, 4B:
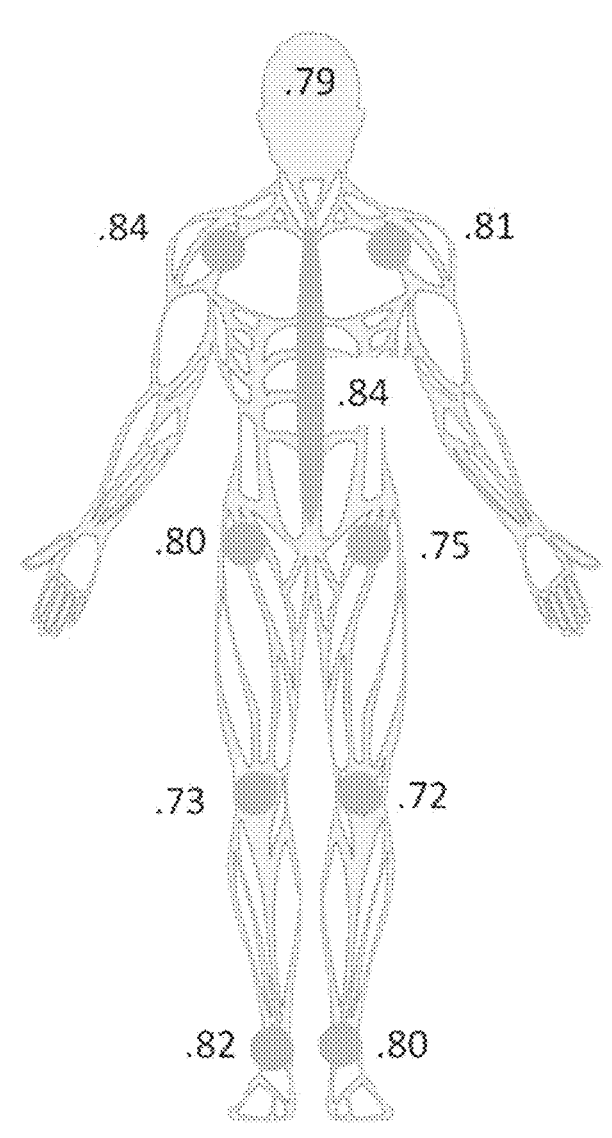
FIG. 4A is a chart illustrating the overall score for a subject based on the scores of multiple joints of a subject in accordance with one embodiment of the present invention.
FIG. 4B is a schematic diagram illustrating the joint scores from the chart of FIG. 4A overlaid on the profile of a human body in accordance with one embodiment of the present invention.

Returning to FIG. 2, in step 224, an overall joint movement score may be generated. In one embodiment, as shown in FIG. 4A, the overall score may be generated by averaging the scores that were generated for each one of the subject's joints. In other embodiments, one or more of the joint scores may be weighted such that more emphasis is placed on the one or more joint scores. In such a case, the scores of those joints can have more of an impact on the overall joint score. In a display step 226, the resulting score(s) and/or system output can be transmitted to a user interface or otherwise generated on a display for a user. In some embodiments, the display step 226 may include generating a report, which can be rendered and displayed on the user interface. In some embodiments, specific aspects of the data or specific data types from the one or more databases 140 may be included in a report, either as pre-configured by the system or as defined by user settings. In some embodiments, the data related to generating, rendering, and transmitting reports can be saved in the one or more databases 140 as report data.

In one non-limiting embodiment, particular joints and particular motions can be scored for a subject. A non-limiting example of scoring related to a subject's particular joint (i.e., left knee) for a particular motion (i.e., a bilateral squat) is provided in Table 1 below.

It will be understood that similar scoring may be done on other of the subject's joints (e.g., right knee, left hip, right hip, etc.) for this particular motion and other motions (e.g., single leg squats, vertical jumps, etc.). As demonstrated in Table 1, measurements for several angles are captured and recorded. Each motion can have directly measured data points for each variable. The population against which the subject is compared can be selected, as described in connection with FIG. 2. The average values, regressions (e.g., linear regressions, etc.), and/or standard deviations for that population can be determined. Ranges for each measured angle, having upper and lower bounds based on the linear regression or standard deviation, are provided. The variables can have population averages, maximum values, standard deviations, and other statistical measurements. In some embodiments, these measurements may be saved in the one or more databases 140, which can include an overall DARI database. In some embodiments, the DARI database can include the normative database, as described in connection with FIG. 1. Scores or variable ratios can be generated for each measurement by comparing a subject's measured value against a population's average using the methodology set forth above. A composite joint score (shown in the bottom right of Table 1) can also be calculated. The composite joint score may be generated by averaging the scores that were generated for each one of the variables. In the example illustrated in Table 1, the composite joint score for the subject's left knee during a bilateral squat is 0.415. In other embodiments, one or more of the scores may be weighted such that more emphasis is placed on the one or more variable ratios. In such a case, the scores of those variables can have more of an impact on the composite joint score.

In an embodiment of the present invention, an overall score for multiple joints of a subject through multiple motions can be determined, as described in more detail herein. A non-limiting example of scoring related to multiple of a subject's joints that are generated based on measurements from a plurality of motions is provided in Table 2 below:

TABLE 1

| Motion Data Points (Bilateral Squat) | Measured | Max$_{popavg}$ | St. Dev | Range | Var. Ratio |
|---|---|---|---|---|---|
| Left Knee Flexion Angle | 115 | 125 | 12 | 113-137 | 0.291667 |
| Left Knee Valgus Angle | 6 | 8 | 3 | 5-11 | 0.666667 |
| Left Knee Joint Torque | 14 | 22 | 5 | 17-27 | 0.2 |
| Left Knee Internal | 15 | 16 | 6 | 10-22 | 0.541667 |
| Left Knee Position | 10 | 9 | 2 | 7-11 | 0.375 |
| Left Knee Variable Ratio | — | — | — | — | 0.415 |

TABLE 2

| Motion List | Left Shoulder | Right Shoulder | Left Hip | Right Hip | Left Knee | Right Knee | Left Ankle | Right Ankle | Spine |
|---|---|---|---|---|---|---|---|---|---|
| Single Leg Squat Right | 0.93 | 0.82 | 0.83 | 0.71 | 0.80 | 0.75 | 0.72 | 0.83 | 0.84 |
| Single Leg Squat Left | 0.66 | 0.77 | 0.45 | 0.88 | 0.68 | 0.74 | 0.99 | 0.92 | 0.91 |
| Bilateral Squat | 0.78 | 0.87 | 0.85 | 0.81 | 0.62 | 0.78 | 0.70 | 0.75 | 0.81 |
| Vertical Jump | 0.86 | 0.90 | 0.86 | 0.80 | 0.77 | 0.66 | 0.79 | 0.78 | 0.82 |
| Overall Joint Ratio | 0.81 | 0.84 | 0.75 | 0.80 | 0.72 | 0.73 | 0.80 | 0.82 | 0.84 |

Composite joint scores for the particular motions can be averaged to generate an overall joint ratio or score for each joint. In the example illustrated in Table 2, the overall joint ratio or score for the subject's left knee is 0.72. In other embodiments, one or more of the composite joint scores may be weighted such that more emphasis is placed on the one or more variables. In this embodiment, the scores of the variables for each joint/motion can have more of an impact on the overall joint ratio or score. In some embodiments, all motions may be included in a collection protocol. The collection protocol can then be categorized by joints and multi-joint variable rations or composite joint rations. The composite joint ratios can be averaged again to create one overall joint ratio score for each joint, as illustrated in Table 2

FIG. 4A includes a table providing examples of overall joint ratios or scores that are generated in accordance with the data shown in Tables 1 and 2. The overall joint ratios or scores can be averaged to generate an overall subject/person ratio or score. In the example illustrated in FIG. 4A, the subject's overall joint ratio or score is 0.79. In other embodiments, one or more of the overall joint ratios or scores may be weighted such that more emphasis is placed on the one or more overall joint ratios or scores. In this case, certain scores can have more of an impact on the overall subject/person ratio or score.

FIG. 4B is a schematic diagram illustrating the overall joint ratios or scores from the chart of FIG. 4A overlaid on the profile of a human to form a visual representation that may be used in reporting or otherwise generated on a user interface or computing device, as described in more detail in connection with FIG. 1.

Figure 5A:
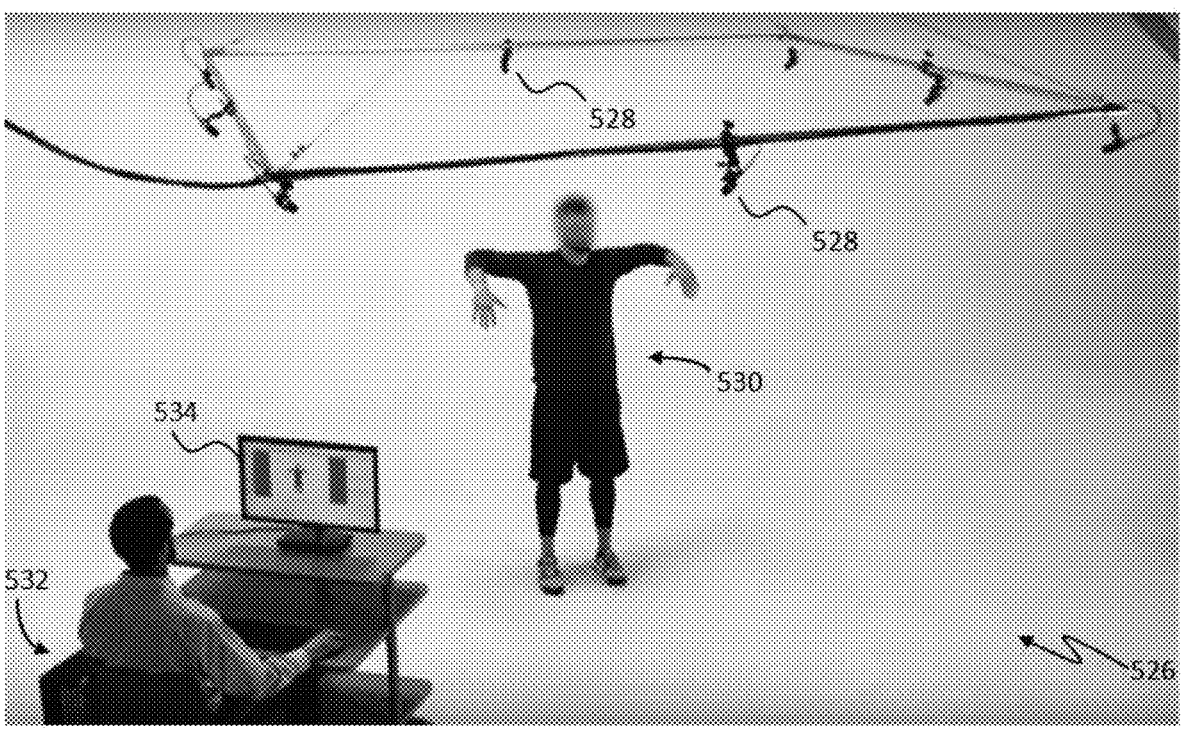
FIG. 5A is a representative photograph illustrating the capture of kinematic data of a subject using a markerless three-dimensional motion capture system in accordance with one embodiment of the present invention.
Figure 5B:
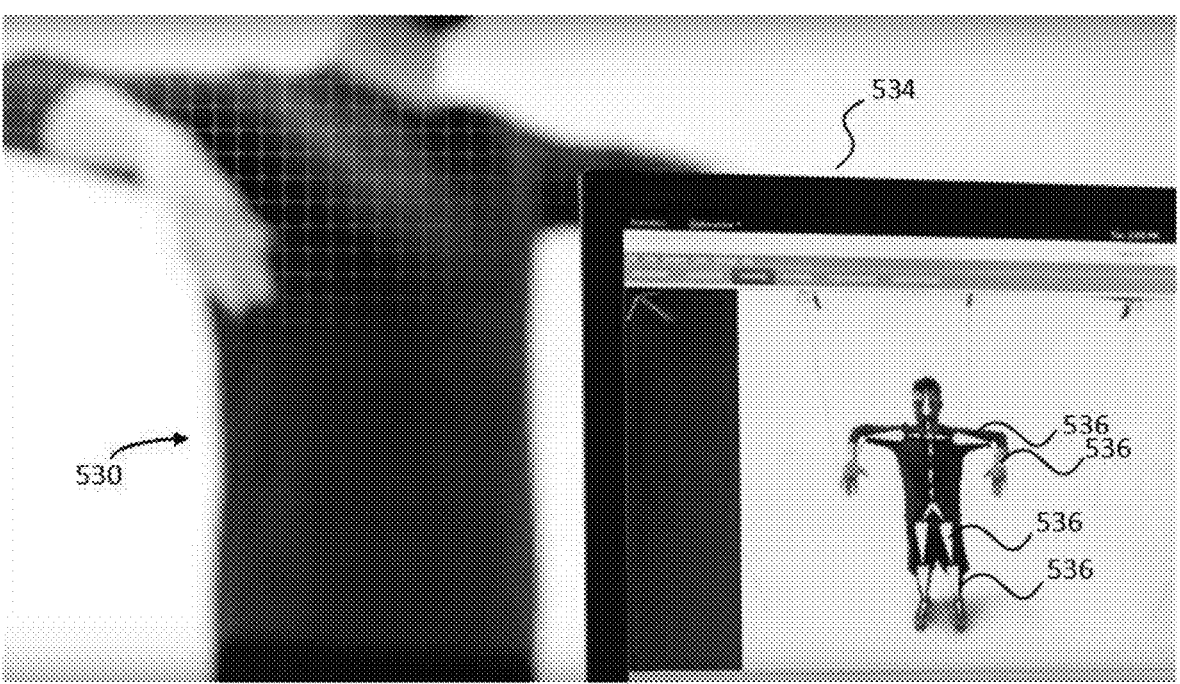
FIG. 5B is a representative photograph illustrating a display screen of the system in accordance with an embodiment of the present invention.

Turning to FIGS. 5A and 5B, as set forth above, the image capture of motion data in step 210 (see FIG. 2) may be achieved using DARI's markerless 3D motion capture system, such as that described in the '217 patent, or any other suitable motion capture system now known or hereafter developed. One embodiment of a motion capture system 526 is illustrated in FIGS. 5A and 5B. As shown, the system 526 generally includes a plurality of optical sensors or cameras 528 positioned around a subject 530 to track the motion of the subject 530. The cameras 528 are in operative communication with a computing workstation 532 either through hardwiring or other wireless communication systems, as described in more detail in connection with FIG. 1. The computer 532 can include a display screen 534 for displaying the subject 530, the subject's various segments 536, the results of the analysis set forth herein, as well as other relevant information. The collected kinematic and joint angle data may then be processed by a computer software program that resides either on the workstation computer 532 or another computer. In one embodiment, the collected data is analyzed using a software program installed on a server (not shown) that is either part of the front-end or the back-end of system 526 depending on a desired infrastructure architecture. For example, all or part of the method of the present invention can be performed using a computer software program having algorithms designed for undertaking some or all of the aspects of the invention occurring at steps 210-226. In one embodiment, some or all of the steps 210-226 are performed using a cloud-based software included in a DARI Vault platform.

A non-limiting example of the system and method described herein is provided in the form of evaluating a right knee flexion angle during a bilateral squat. The following is an example utilizing a method according to one embodiment of the present invention to generate a score or variable ratio for a subject's right knee flexion angle during a bilateral squat. In this example, the motion data captured from the subject during the bilateral squat, and the kinematic data extracted therefrom, shows that the subject's right knee flexion angle is 120°. In this example, it is determined that the population regression curve against which the subject is being compared has an average right knee flexion angle of 125° during the bilateral squat, with the population polynomial regression curve calculated using upper and lower limits of 95% and 5% and having a range of 111° to 139°. As set forth above, for knee flexion angles, higher values are desirable.

In this example, the variable ratio or score for the subject's right knee flexion angle (which was measured at) 120° may be calculated using one or more of various regression models, including but not limited to, linear, multi-linear, logistic, polynomial, quantile, principle components, partial least squares, support vector, Poisson, quasi, Cox, Tobit Lasso, Beta, Burr, log-normal, Gamma, Logarithmic, Ridge regression models, or other forms of regression. Below is an example of a polynomial regression that may be used:

$$\begin{bmatrix} c_1 \\ c_2 \\ c_3 \end{bmatrix} = $$

$$\begin{bmatrix} \sum_{k=1}^{n} f_1^2(x_k) & \sum_{k=1}^{n} f_1(x_k)f_2(x_k) & \sum_{k=1}^{n} f_1(x_k)f_3(x_k) \\ \sum_{k=1}^{n} f_2(x_k)f_1(x_k) & \sum_{k=1}^{n} f_2^2(x_k) & \sum_{k=1}^{n} f_2(x_k)f_3(x_k) \\ \sum_{k=1}^{n} f_3(x_k)f_1(x_k) & \sum_{k=1}^{n} f_3(x_k)f_2(x_k) & \sum_{k=1}^{n} f_3^2(x_k) \end{bmatrix}^{-1} \cdot \begin{bmatrix} \sum_{k=1}^{n} f_1(x_k) \cdot y_k \\ \sum_{k=1}^{n} f_2(x_k) \cdot y_k \\ \sum_{k=1}^{n} f_3(x_k) \cdot y_k \end{bmatrix}.$$

Of course, with other subjects, the knee flexion angle may be measured at something other than 120°. For example, it could be measured to be greater than or less than 120°. In such cases, the score generated for the right knee flexion angle during a bilateral squat would, depending upon the measured angle, be as shown in Table 3:

TABLE 3

| Flexion Angle | Score |
|---|---|
| 139° | 1 |
| 138° | 0.964286 |
| 137° | 0.928571 |
| 136° | 0.892857 |
| 135° | 0.857143 |
| 134° | 0.821429 |
| 133° | 0.785714 |
| 132° | 0.75 |
| 131° | 0.714286 |
| 130° | 0.678571 |
| 129° | 0.642857 |
| 128° | 0.607143 |
| 127° | 0.571429 |
| 126° | 0.535714 |
| 125° | 0.5 |
| 124° | 0.464286 |
| 123° | 0.428571 |
| 122° | 0.392857 |
| 121° | 0.357143 |
| 120° | 0.321429 |
| 119° | 0.285714 |
| 118° | 0.25 |
| 117° | 0.214286 |
| 116° | 0.178571 |
| 115° | 0.142857 |
| 114° | 0.107143 |
| 113° | 0.071429 |
| 112° | 0.035714 |
| 111° | 0 |

The variable-ratio generated for the subject's right knee flexion angle during a bilateral squat (i.e., 0.321429) can then be averaged with other right knee variable ratios (e.g., for valgus angle, joint torque, internal rotation, position, etc.) to generate a composite joint score for the right knee for the bilateral squat. Subsequently, the composite joint score for the right knee for the bilateral squat may be averaged with the composite joint scores for the right knee for other movements (e.g., single leg squat, vertical jump, etc.) to generate an overall joint ratio or score for the right knee. Then, the overall joint ratio or score for the right knee may be averaged with the overall joint ratios or scores from other joints (e.g., left knee, right hip, left hip, right ankle, left, ankle, right shoulder, left shoulder, spine, etc.) to generate an overall subject/person ratio or score.

There may be variances in score or ratio combinations and how the metrics are joined. For example, in one instance, (1) movement scores for a particular joint can be averaged to generate a composite joint score, (2) joint scores of the various joints in a limb can be averaged to generate a composite limb score, (3) limb scores of the various limbs in a hemisphere (upper or lower) or side (left or right) of the body can be averaged to generate a composite hemisphere score or composite side score, and/or (4) hemisphere scores or side scores can be averaged to generate an overall subject/person score. The opposite can also be true wherein (1) an overall subject/person score may be used to predict a hemisphere score or side score, (2) a hemisphere score or side score may be used to predict a limb score of a limb within such hemisphere or side of the body, (3) a limb score may be used to predict a joint score of a joint within the limb, and/or (4) a joint score may be used to predict a movement score of a particular movement the joint may undertake.

In some embodiments, systems and methods and/or their components disclosed in this application, can include computing devices, microprocessors, modules, and other computer or computing devices, which can be any programmable device that accepts digital data as input, can be designed to process the input according to instructions or algorithms, and provides results as outputs. In an embodiment, computing and other such devices discussed herein can be, comprise, contain, or be coupled to a central processing unit (CPU) configured to carry out the instructions of a computer program. Computing devices (and similar) discussed herein are therefore configured to perform basic arithmetical, logical, and input/output operations.

Some embodiments of the present invention may be used to analyze image data and motion data for a subject at a first instance, for example when starting a new position. In this non-limiting example, the image data and the motion data for the subject can be evaluated at a second instance and then compared to the analysis and calculated score at the first instance. In this way, the system and methods described herein can be used to objectively determine a change in one or more metrics, parameters, or variables. As a specific non-limiting example, if a subject is evaluated at the start of a new position, and then evaluated again after reporting an injury, the comparison of the data can objectively determine if there were pre-existing deficiencies (or similar) that may have impacted or led to injury. In some embodiments, the first instance and second instance described in this non-limiting example can be saved as a first session data set and a second session data set in the one or more databases 140

In another non-limiting example, the system and methods of the present invention can be used to provide objective evaluation of an athlete to determine if there is a predisposition for a certain injury, as determined by the calculated joint and motion scores described in the embodiments above.

In another non-limiting example, the system and methods of the present invention can be used to track a subject's rehabilitation progress, as compared to population data, to objectively determine if prescribed rehabilitation measures are being completed.

These examples are in no way exhaustive and are meant to illustrate the wide range of industries, applications, and embodiments.

Various embodiments of systems, devices, and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations, locations, etc. have been described for use with disclosed embodiments, others besides those disclosed may be utilized without exceeding the scope of the invention.

In some embodiments, the system or components thereof can comprise or include various modules or controllers, each of which is constructed, programmed, configured, or otherwise adapted, to autonomously carry out a function or set of functions. The term "controller" as used herein can include a real-world device, component, or arrangement of components implemented using hardware, or as a combination of hardware and software, such as by a microprocessor system and a set of program instructions that adapt the controller to implement the particular functionality, which (while being executed) transform the microprocessor system into a special-purpose device. A controller can also be implemented as a combination of the two, with certain functions facilitated by hardware alone, and other functions facilitated by a combination of hardware and software. In certain implementations, at least a portion, and in some cases, all, of a controller can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the controller using multitasking, multi-threading, distributed (e.g., cluster, peer-peer, cloud, etc.) processing where appropriate or other such techniques. Accordingly, each controller can be realized in a variety of physically realizable configurations, and should generally not be limited to any particular implementation exemplified herein, unless such limitations are expressly called out. In addition, a controller can itself be composed of more than one sub-controllers, each of which can be regarded as a controller in its own right. Moreover, in the embodiments described herein, each of the various controllers corresponds to a defined autonomous functionality; however, it should be understood that in other contemplated embodiments, each functionality can be distributed to more than one controller. Likewise, in other contemplated embodiments, multiple defined functionalities may be implemented by a single controller that performs those multiple functions, possibly alongside other functions, or distributed differently among a set of controllers than specifically illustrated in the examples herein.

Certain embodiments of the present disclosure provide software comprising a series of instructions executable by a processor to carry out a method as described herein. Certain embodiments of the present disclosure provide software for use with a computer comprising a processor and memory for storing the software, the software comprising a series of instructions executable by the processor to carry out a method as described herein.

The constructions described above and illustrated in the drawings are presented by way of example only and are not intended to limit the concepts and principles of the present invention. Thus, there has been shown, and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations, and other uses and applications of the present construction will, however, become apparent to those skilled in the art after considering the specification and the accompanying drawings. All such changes, modifications, variations, and other uses and applications which do not depart from the spirit and scope of the invention are deemed to be covered by the invention which is limited only by the claims which follow.

What is claimed is:

1. A motion analysis system for image data analysis and objective evaluation of joint motion, the system comprising:
a motion capture system;
one or more image data capture devices designed to capture image data;
a database storing joint measurements associated with a subset of a population, the joint measurements including first measurements associated with a first type of movement associated with a first type of joint and second measurements associated with a second type of movement associated with the first type of joint;
a memory storing programmable instructions;
at least one processor communicatively connected to the memory and designed to execute the programmable instructions to cause the motion analysis system to:
determine that a first type of regression model best fits the first measurements associated with the first type of movement associated with the first type of joint;
determine that a second type of regression model best fits the second measurements associated with the second type of movement associated with the first type of joint, the first type of regression model different than the second type of regression model;
extract motion data from the image data of the subject, the motion data indicating the first type of movement associated with the first type of joint of the subject;
select, based in part on the first type of movement, the first type of regression model for analyzing the motion data using a regression model selection module; and
calculate a score based on an output of the first type of regression model compared to the motion data of a subject using a scoring module.

2. The motion analysis system of claim 1 wherein the motion capture system can be provided in the form of a markerless motion capture system.

3. The motion analysis system of claim 1 wherein the motion data can include kinematic data, kinetic data, or a combination thereof.

4. The motion analysis system of claim 1 further comprising a user interface, wherein an output score is generated from the scoring module and generated on the user interface.

5. The motion analysis system of claim 1 wherein the first type of regression model is at least one of a linear, multi-linear, logistic, polynomial, quantile, principle components, partial least squares, support vector, Poisson, quasi, Cox, Tobit Lasso, Beta, Burr, log-normal, Gamma, Logarithmic, or Ridge regression model.

6. The motion analysis system of claim 1, wherein the first type of joint is a knee, the first type of movement is a squat, and the second type of movement is a jump.

7. The motion analysis system of claim 1, wherein the first type of regression model is used to create a regression formula derived from a slope of the first measurements.

8. The motion analysis system of claim 1 wherein the output of the scoring module includes a visual representation of an output score for the subject.

9. A motion analysis method for analyzing image data and scoring joint motion, the method comprising the steps of:
capturing image data;
extracting motion data of a subject performing a specific movement from the image data;
defining a population against which to compare the subject;
selecting a regression formula that corresponds to a variance in measurements of the specific movement among members of the population; and
generating, based on an output of the regression formula, a score for the subject that indicates performance of the specific movement by the subject relative to the population.

10. The motion analysis method of claim 9 further comprising the step of:

generating a first variable ratio for a first measurement of a first joint of the subject for the specific movement.

11. The motion analysis method of claim 10, wherein the first variable ratio is generated using at least one of a linear, multi-linear, logistic, polynomial, quantile, principle components, partial least squares, support vector, Poisson, quasi, Cox, Tobit Lasso, Beta, Burr, log-normal, Gamma, Logarithmic, or Ridge regression model.

12. The motion analysis method of claim 10, wherein the first variable ratio is generated in accordance with the following:

$$\underset{\substack{Dependent \\ Variable}}{Y_i} = \underset{\substack{Population \\ Y\ intercept}}{\overset{}{\beta_0}} + \underset{\substack{Population \\ Slope \\ Coefficient}}{\overset{}{\beta_1}} \underset{\substack{independent \\ variable}}{X_i} + \underset{\substack{Random \\ Error \\ term}}{\varepsilon_i} .$$

$$\underbrace{\qquad\qquad\qquad}_{Linear\ component} \quad \underbrace{\qquad}_{\substack{Random\ Error \\ component}}$$

13. The motion analysis method of claim 10, wherein the first variable ratio is generated in accordance with the following:

$$\begin{bmatrix} c_1 \\ c_2 \\ c_3 \end{bmatrix} =$$

$$\begin{bmatrix} \sum_{k=1}^{n} f_1^2(x_k) & \sum_{k=1}^{n} f_1(x_k)f_2(x_k) & \sum_{k=1}^{n} f_1(x_k)f_3(x_k) \\ \sum_{k=1}^{n} f_2(x_k)f_1(x_k) & \sum_{k=1}^{n} f_2^2(x_k) & \sum_{k=1}^{n} f_2(x_k)f_3(x_k) \\ \sum_{k=1}^{n} f_3(x_k)f_1(x_k) & \sum_{k=1}^{n} f_3(x_k)f_2(x_k) & \sum_{k=1}^{n} f_3^2(x_k) \end{bmatrix}^{-1} \cdot \begin{bmatrix} \sum_{k=1}^{n} f_1(x_k)\cdot y_k \\ \sum_{k=1}^{n} f_2(x_k)\cdot y_k \\ \sum_{k=1}^{n} f_3(x_k)\cdot y_k \end{bmatrix} .$$

14. The motion analysis method of claim 10 further comprising the step of:

generating a second variable ratio for a second measurement of the first joint of the subject for the specific movement.

15. The motion analysis method of claim 13 further comprising the step of:

combining the first variable ratio with at least the second variable ratio to generate a first composite score for the first joint of the subject for the specific movement.

16. The motion analysis method of claim 14 further comprising the step of:

combining the first composite score with at least a second composite score to generate an overall score for the first joint of the subject.

17. The motion analysis method of claim 15 further comprising the step of:

combining the overall score for the first joint of the subject with an overall score for at least a second joint of the subject to generate an overall subject score.

18. The motion analysis method of claim 9 wherein the motion data can include kinematic data, kinetic data, or a combination thereof.

19. A motion analysis system for image data analysis and objective evaluation of joint motion, the system comprising:

a markerless motion capture system;

one or more image data capture devices designed to capture image data of a subject;

a first database storing first joint measurements associated with a subset of a population, the first joint measurements associated with a first type of movement associated with a first type of joint;

a second database storing second joint measurements associated with the subset of the population, the second joint measurements associated with a second type of movement associated with the first type of joint;

a memory storing programmable instructions;

at least one processor communicatively connected to the memory and designed to execute the programmable instructions to cause the motion analysis system to:

extract first motion data from the image data, the first motion data indicating the first type of movement associated with the first type of joint of the subject;

select, based on a first variance in the first joint measurements, a first regression model for analyzing the first motion data using a regression model selection module, wherein a first regression model output is generated from the first regression model;

calculate a first score associated with a subject using a scoring module, wherein the first score is calculated based on a comparison of the first motion data relative to the first regression model output;

extract second motion data from the image data, the second motion data indicating the second type of movement associated with the first type of joint of the subject;

select, based on a second variance in the second joint measurements, a second regression model for analyzing the second motion data using the regression model selection module, wherein a second regression model output is generated from the second regression model; and calculate a second score associated with a subject using the scoring module, wherein the second score is calculated based on a comparison of the second motion data relative to the second regression model output.

20. The system of claim 19, wherein the programmable instructions further cause the motion analysis system to determine an overall score for the first type of joint of the subject based on the first score and the second score.

* * * * *